United States Patent [19]

Favie

[11] 4,234,692
[45] Nov. 18, 1980

[54] PREPARATION OF SULPHONIUM POLYMERS

[75] Inventor: Claude Favie, Pau, France

[73] Assignee: Societe Nationale Elf Aquitaine (Production), Paris, France

[21] Appl. No.: 18,170

[22] Filed: Mar. 7, 1979

[30] Foreign Application Priority Data

Aug. 3, 1978 [FR] France ............................... 78 06723

[51] Int. Cl.$^3$ ............................................. C08F 08/34
[52] U.S. Cl. ...................................... 521/33; 525/350; 525/329
[58] Field of Search .................... 528/109; 521/34, 33; 526/37; 525/350

[56] References Cited

U.S. PATENT DOCUMENTS

| 2,831,830 | 4/1958 | Schroeder | 528/99 |
| 2,992,210 | 7/1961 | Gluckman | 526/37 |
| 3,793,278 | 2/1974 | De Bona | 260/29.2 EP |
| 3,959,106 | 5/1976 | Bosso et al. | 260/29.2 TN |
| 4,029,621 | 6/1977 | Hartmann et al. | 528/109 |

OTHER PUBLICATIONS

Organic Chemistry-2nd Edition-Morrison Boyd, pp. 466-467.

Primary Examiner—Joseph L. Schofer
Assistant Examiner—Peter F. Kulkosky
Attorney, Agent, or Firm—Ostrolenk, Faber, Gerb & Soffen

[57] ABSTRACT

Beta-hydroxyl polysulphoniums are prepared from polymers having epoxy groups in the polymeric chain or on the side chains. The polymer is treated with one or more mercaptans or thiols in the presence of a catalyst which opens the oxirane bridges, in particular a basic catalyst, after which the remaining epoxy groups are eliminated by the action of an acid; the resultant polysulphide is then reacted with an alkyl halide or ester in the absence of acid in order to form the polysulphonium. Purification of the product is then carried out. The products can be obtained in this manner in a form which is soluble or dispersible in water in a suitable state of purity, with good yields and with the desired hydrophilic-lipophilic ratio.

14 Claims, No Drawings

PREPARATION OF SULPHONIUM POLYMERS

DESCRIPTION

The invention relates to the preparation of polymers carrying sulphonium groups. It is concerned more particularly with obtaining such polymers having aliphatic side chains, in which a hydroxyl group is located in the β-position with respect to the sulphonium groups. These compounds, in the following description, are referred to as β-hydroxyl polysulphoniums.

Polymers having sulphonium functions are utilised in various branches of industry, particularly as ion-exchange resins, textile treating agents, flocculants, cationic thickeners, heavy metal chelatants, paper reinforcing agents, agricultural germicides, fungicides, dye additives and so on. The economic preparation of these products thus has undeniable interest, especially as the processes used at present, which are based particularly on the action of an organic sulphide on resins having epoxy groups in the presence of an acid (U.S. Pat. Nos. 3,793,278 and 3,959,106), do not always lead to satisfactory results. According to the prior art, it is difficult to obtain β-hydroxyl polysulphoniums which are sufficiently pure and stable as required for various applications, for example in cosmetology and biochemistry. Furthermore, known techniques do not provide a means for obtaining products having a desired hydrophilic-lipophilic balance.

The present invention relates to a process for the preparation of β-hydroxyl polysulphoniums with very good yields, in the state of purity desired and with the required pre-determined proportion of hydrophilic groups. Thus, the process according to the invention allows sulphonium polymers to be obtained which are swellable by water to a greater or lesser extent or are completely hydrosoluble, depending upon practical needs. The invention permits the synthesis of biodegradable β-hydroxyl polysulphoniums, the presence of the —OH group contributing to the process of biodegradability.

The process according to the invention for the preparation of β-hydroxyl polysulphoniums starting from a resin carrying epoxide groups is characterised in that a mercaptan or thiol is reacted with an epoxided resin in the presence of a catalyst which favours opening of oxirane structures and attachment of the mercaptan to the opened epoxide bridge; after this, the remaining epoxy groups are eliminated before the polysulphided polymer so obtained is treated with an alkyl halide or ester in order to transform it into the corresponding sulphonium salt.

Thus, the process according to the invention comprises the three following phases.

1. Treatment of a polymer containing epoxy groups in the chain or on the side chains of the main polymer backbone by a thiol in solution in a suitable solvent, to which a catalyst for opening the oxirane bridges is added. Any catalysts known for opening oxirane bridges can be used, such as Lewis acids, inorganic bases, Lewis bases and phenol, mineral acids preferably being excluded. In the case of the present invention, particularly interesting results are obtained when the catalyst is an inorganic base, preferably an alkali metal base in alcoholic solution. Since a catalytic action is concerned, the proportion of the base is not critical, but it is preferable to utilise a proportion of the order of 1% to 10%, most preferably 5% to 10%, of the molar quantity of epoxide bridges present in the polymer being treated.

The reaction can be effected at a temperature ranging from the ambient to 100° C., preferably at 40° to 60° C., in which case several hours are required for completion. The duration depends on the nature of the reactants utilised, but it is usually of the order of 10 minutes to 3 hours.

The reaction can be represented as follows, only the reactive sites of the polymer being shown:

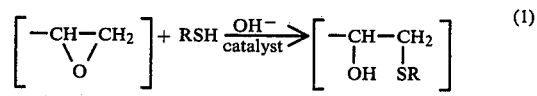

Several mercaptans can be attached simultaneously to the epoxided polymer, which by the nature of the mercaptan or mercaptans allows considerable control of a certain number of properties, in particular the hydrophilic-lipophilic balance of the final product.

The mercaptans or thiols which can be used in the process of the invention are extremely numerous and are known in the prior art. They correspond to the general formula RSH, in which R can be a straight or branched alkyl, alkenyl or alkynyl radical having 1 to 20 carbon atoms; R can also be an aromatic, cyclo-aromatic, alkyl-aromatic or other group, without this list being limitative. Particularly interesting results are obtained with lauryl mercaptan, octyl mercaptan and butyl mercaptan.

In general, the rate of transformation of the epoxy groups into sulphide groups can be of the order of 90% to 100%, but most usually it is from 95% to 99%. In fact, the overall reactivity of the constituents on the epoxided group, although greatly favoured by the considerable reactivity of this function, cannot be 100%. To avoid subsequent cross-linking and secondary reactions, which epoxy groups are likely to give rise to, it is preferable to destroy all residual traces of epoxy groups. The solution containing the polysulphide with the few remaining epoxy groups is thus subjected to a second phase of operation as below.

2. Elimination of residual epoxide groups in the polysulphide obtained. This operation is not carried out according to the prior art. It has considerable importance, since it eliminates all undesirable cross-linking reactions, which would prevent maintenance of the polysulphoniums in solution.

According to the invention, the solution obtained in phase 1 above is thoroughly acidified, preferably with a strong acid such as a hydracid, and is maintained hot for a time sufficient to effect opening of the epoxide rings of the polysulphided polymer. This operation can occur at temperatures of the same order as those used in the previous phase, the proportion of acid preferably being about 1.5 to 3 equivalents per residual epoxide unit in the polymer. Generally, 2 to 20 minutes suffice for the reaction which opens the epoxide rings to be complete.

The following reaction takes place at the epoxided sites of the polysulphide:

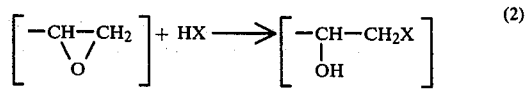

It is necessary to use a strong hydracid so that the residual epoxide bridges which have resisted attack by the thiol function but are still very active are destroyed. Although various acids can be utilised, HX advantageously is HCl.

3. Transformation of the polysulphide obtained in the second phase of the process into a polysulphonium is effected according to the invention, after separation of the polysulphide from its reaction medium. For this purpose, the solution or suspension resulting from the two previous operations, 1 and 2, is treated so as to separate the polysulphide, freed from epoxy groups, in the solid state. This can be realised by precipitation with the aid of a non-solvent, followed by appropriate washing. Thus, contrary to the practice of the prior art, there is no acid in the product during the transformation into a sulphonium.

However, if the presence of a trace of HCl does not disturb transformation of the polysulphide into the corresponding sulphonium, it is possible to not separate the polysulphide after elimination of the oxirane bridges.

In most cases, tetrahydrofuran is suitable as a solvent for the initial polymer, while a $C_6$ to $C_{10}$ alkane, particularly heptane, or petroleum ether, can serve as a suitable non-solvent for precipitating the polysulphide freed from epoxy groups.

To effect transformation of the polysulphide into the polysulphonium, an alkyl halide or ester, $X_1R'$, where $X_1$ is a mineral or organic acid residue or a halide, is added to a solution or, if necessary, a suspension of the polysulphide obtained as indicated, and this produces the known reaction:

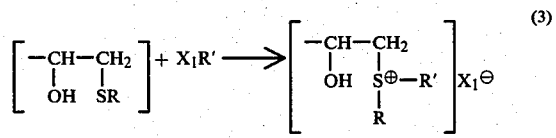

(3)

This reaction generally takes place at 20° to 100° C., preferably at 50° to 70° C.

The quantity of the halide or ester $X_1R'$ required is 1 to 5 moles per

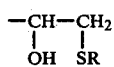

group present in the polymer treated, the preferred proportion being 1.5 to 3.5.

The alkyl group R' can be entirely alkyl and, in particular, is $C_1$ to $C_{12}$. As regards $X_1$, it can be constituted by an acid residue, for example sulphuric, phosphoric, perchloric, acetic, propionic and so on. The reaction is particularly easy with $X_1R'$ formed by iodides, bromides and sulphates, for example $CH_3I$, $CH_3Br$ or $(CH_3)_2SO_4$.

When this operation has been carried out in solution, it is preferable to recover the final product by precipitation, particularly by the same procedure as that indicated above, and to wash the precipitate obtained in order to have finally a sufficiently pure sulphonium polymer.

While the process described permits the achievement of a conversion yield of about 95% to 100% of the initial epoxy groups into sulphonium functions, it can be useful not to go so far in order to have a desired number, more or less large, of sulphonium groups per unit weight of the polymer. In this case, phase 1 of the process is arrested when the desired content of sulphide groups has been attained. The residual epoxides are hydrolysed, for example into diols, or are transformed into chlorhydrin by aqueous or non-aqueous hydrochloric acid, as previously described. Thus, in order to control the hydrophilic-lipophilic balance of the final product, a certain number of parameters can be regulated, such as the concentration of sulphide ions and the nature and length of the mercaptans. It is also possible to regulate the hydrophilic-lipophilic balance by the constitution of the polymeric chain, for example by the nature and concentration of the monomers in the initial copolymer.

As regards epoxy group polymers capable of being used as starting materials for the process of the invention, they are numerous and are known in the art. They are in particular copolymers of various compounds polymerisable with unsaturated monomers containing a terminal glycidyl group. Thus, glycidyl acrylate or methacrylate copolymers can be used as with monomers such as styrene, methylstyrene, isobutene, 2-methyl-butene-1, 2-methyl-pentene-1, 2,6-dimethyl-heptene-1, butadiene, isoprene, chlorostyrene, chlorobutene, tetrafluoroethylene, vinyl acetate, allyl chloride, allyl acetate, lower alkyl acrylates, lower alkyl methacrylates, acrylonitrile, methacrylonitrile, vinyl pyrrolidone and so on. The epoxided polymers can also be produced by oxidation of the double bonds situated in the side groups of the polymeric chain or on terminal double bonds. This arises, for example, with polymers on which diolefines are grafted or also with olefin-diolefin copolymers which are rich in 1,2-vinyl linkages, such as styrene-butadiene copolymers for example.

The epoxided polymers can also be selected from those in which the epoxided bridge is on the main chain, such as butadiene, polyisoprene, epoxided polyisobutylene, isoprene-isobutene copolymers and others. This list is given merely by way of illustrative example, as persons skilled in the art can always select a polymer with epoxided side chains which is suitable for carrying out the present invention.

The invention is illustrated by the following non-limitative examples. These examples relate to a particular case which is particularly interesting from the practical standpoint, in which the starting polymer is a copolymer of methyl methacrylate and glycidyl methacrylate.

EXAMPLE 1

Preparation of the copolymer

The preparation is effected starting from a copolymer of methyl methacrylate (M1) with glycidyl methacrylate (M2), namely a polymer formed from the units:

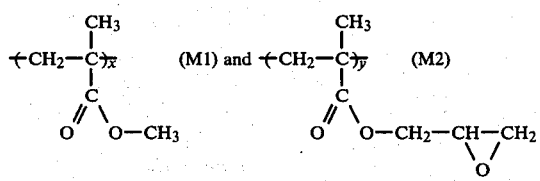

This copolymer is prepared in the following manner.

25 g (250 milli-equivalents) of monomer M1 and 106 g (750 milli-equivalents) of monomer M2 were introduced into a reactor containing 150 g methyl ethyl ketone and 150 g xylene. The temperature of the mixture was taken to 70° C. and, over 3 hours at a regular rate, 1.8 g azobisisobutyronitrile in solution in 20 ml methyl ethyl ketone was added. Then 0.35 g azobisisobutyronitrile was added in a single quantity and the reaction was continued for 5 hours. The resultant polymer was precipitated by slowly pouring the reaction product into 3 l of methanol. The product was dried. The amount of epoxided polymer, determined by hydrochloric acid in dimethyl formamide, indicated that the compound contained 5.7 milli-equivalents of epoxy groups per gram of copolymer. The molecular weight, determined on a Waters type GPC apparatus designated "GPC 200," the column being provided with Stiragel having a porosity of $10^7$ to $10^3$, was 50900. The copolymer contains 25 M1 units per 75 M2 units.

EXAMPLE 2

Preparation of polysulphonium 119 g of the copolymer prepared as in Example 1, viz 678 milli-equivalents of epoxide, were dissolved in 1060 g tetrahydrofuran (THF). 151 g (750 milli-equivalents) of lauryl mercaptan were added and then 3.3 g KOH dissolved in 25 ml butanol, viz. 60 milli-equivalents, as the reaction catalyst, were added. The mixture was allowed to react for 5 hours at 60° C. Then 100 milli-equivalents of 38% aqueous HCl was added. Precipitation of KCl was observed. The medium was acid and the traces of epoxide disappeared. The medium was neutralised by the addition of 37 milli-equivalents of KOH. It can be deduced that the yield of the reaction is equal to or better than 95%. The KCl was eliminated by filtration and the filtrate constituted a solution of the polysulphide polymer in THF. 94 g $(CH_3)_2SO_4$ (750 milli-equivalents) was added to the filtrate and the mixture was allowed to react at 50° C. for 6 hours. The polysulphonium polymer so formed was precipitated by the addition of 2 l heptane. The precipitate was filtered off and dried, giving brilliant white flakes. The yield of the latter stage was 82%. The product obtained is insoluble in water and is soluble in butanol, dimethyl formamide and isoamyl alcohol. 1% solutions can be prepared in a mixture of 70% butanol and 30% water. By agitation, these solutions give foams. The yield of this preparation based on the initial copolymer was 78%.

EXAMPLE 3

A similar operation to that of Example 2 was carried out, but the lauryl mercaptan was replaced with 750 milli-equivalents of propyl mercaptan. The course of the reaction was identical. However, it was observed that the action of the propyl mercaptan was exothermic and rapid. On the other hand, when dimethyl sulphate was added, the THF medium became turbid and the polysulphonium polymer precipitated in the cold. It was filtered off and washed with heptane.

The product is very soluble in water and in alcohols. Agitated solutions produce foams.

EXAMPLE 4

A similar operation to that of Example 2 was carried out, but the lauryl mercaptan was replaced with octyl mercaptan. The polysulphonium polymer obtained is insoluble in water, soluble in alcohols and is 1% soluble in mixtures of 50% water and 50% butanol.

The three latter examples show a relationship between the solubility in water of the polysulphonium polymers and the length of the alkyl chain of the mercaptan. The products are more soluble in water as their alkyl chain is shorter. This property is important for various applications of these products.

EXAMPLES 5 to 8

A copolymer was prepared as in Example 1 in which the monomers were in equimolar quantities, namely 160 g of monomer M1 and 141 g of monomer M2. This copolymer contained 3.95 milli-equivalents of epoxide per gram.

126.8 g (840 milli-equivalents) of butyl mercaptan and 5.5 g KOH dissolved in 45 ml butanol (namely 98 milli-equivalents) were added as the reaction catalyst to 200 g of the copolymer or 790 milli-equivalents of epoxy dissolved in 1765 g THF. This corresponded to a molar proportion of KOH of 12.4% with respect to the epoxide bridges present. The rest of the reaction took place as described in Example 2. The filtrate constituted a solution of the polysulphide polymer in THF and was divided into four parts. Each part was treated with various XR' reactants in different proportions and at different temperatures.

The table below gives the results obtained:

TABLE I

| Example No. | 5 | 6 | 7 | 8 |
|---|---|---|---|---|
| Nature of XR' | $CH_3I$ | $CH_3Br$ | $(CH_3)_2SO_4$ | $(CH_3)_2SO_4$ |
| Molar ratio of XR' to sulphide group | 3 | 3 | 3 | 1.5 |
| Temperature °C. | 40 | 40 | 50 | 65 |
| Duration of the reaction in hours | 6 | 6 | 6 | 10 |
| Approx. molar % composition of the product obtained: | | | | |
| Methylmethacrylate units | 54 | 54 | 52 | 52 |
| Glycidyl methacrylate units | 0 | 0 | 0 | 0 |
| Sulphide units derived from glycidyl units | 31 | 25 | 10 | 7 |
| Sulphonium units | 11.5 | 17.5 | 34.5 | 37.5 |
| Units carrying $-\underset{\underset{OH}{\mid}}{CH}-CH_2C-$ in place of epoxy groups | 3.5 | 3.5 | 3.5 | 3.5 |

As can be seen, the new process allows various desired compositions to be obtained.

EXAMPLE 9

The operations of Example 2 were repeated with 193 g cetyl mercaptan (hexadecyl mercaptan, $C_{16}H_{33}SH$) in place of the 151 g of lauryl mercaptan. The polysulphonium methosulphate was thus obtained, having a chain of the kind described in Example 1. The formula of the polymer can be represented diagrammatically as follows:

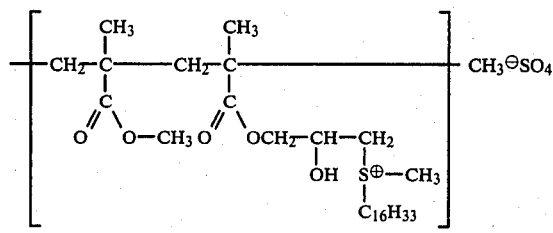

In other words, this polymer differs from that of Example 2 in that R is hexadecyl ($C_{16}H_{33}$—) instead of dodecyl ($C_{12}H_{25}$—).

The following Table II shows the increase in the number of yeast grains after 3 days of culturing in a flask.

In Table II, tests carried out with the polysulphoniums of Examples 2(R=12), 4(R=8) and 9(R=16) are given. These compounds were used in the form of 2% solutions in a solvent mixture comprising:
20 parts isobutanol
20 parts acetone
60 parts water
25 ml of this solution took up 0.5 g of polysulphonium or 1000 ppm of the 500 ml contents of each flask.

The above solvent alone, tested comparatively, is designated by the term "solvent alone."

TABLE II

| Additive | Increase in Number of Yeast Grains per ml |
|---|---|
| None | $10^6$ |
| 25 ml sterilized water | $10^6$ |
| 25 ml solvent alone | $10^4$ |
| 25 ml solution, product of Example 2 (R = 12) | 0 |
| 25 ml solution, product of Example 4 (R = 8) | $10^2$ |
| 25 ml solution, product of Example 9 (R = 16) | 0 |

EXAMPLE 10

Fungicidal use of polysulphonium according to the invention

Aqueous engineering fluids, notably cutting oils, are subject to fungal attack. The natural fungal flora were allowed to develop on such a fluid, constituted by a 2.5% emulsion in water of the product known commercially under the name "SARELF UTV." The culture medium C obtained then served to inoculate a series of freshly-prepared emulsions of the same product.

The tests were carried out in 1000 ml conical flasks (Erlenmeyer). 500 ml of the above 2.5% aqueous SARELF UTV emulsion and 25 ml of a test liquid of a composition given in detail above were introduced into each flask, together with a small amount of culture C, so that there were $10^5$ yeast grains per ml of liquid in each flask. The yeasts were accompanied by hyphic moulds.

The flasks were maintained at 20°-25° C., the contents being agitated each day for 12 hours so as to render the culture aerobic.

After predetermined periods, usually of 3 or 4 days, samples of liquids were taken from the flasks in order to measure the amounts of yeast present.

EXAMPLE 11

A new inoculation portion was added to flasks containing 1000 ppm of the additives of Examples 2 and 9, where no fungal growth had occurred in accordance with Example 10, in the amount of $10^5$ yeast grains per ml of the contents of each of the corresponding flasks. Aerobic culture was again carried out at 20°-25° C. as in Example 10 for 4 days. When it was found that no increase in the number of grains took place, a new inoculation was effected and the test then continued as above.

This showed that, with the polysulphonium of Example 2(R=12), the yeasts began to multiply only following the 5th inoculation. $10^2$ per ml were found after 4 days of aerobic culturing, starting from the 5th addition of the inoculum.

The polysulphonium of Example 9 gave an even better result, as the increase in fungal flora in its presence only began after 6 inoculations.

I claim:
1. A method of preparing a polymer the chain of which bears lateral branchings terminated by a sulfonium group and the chain of which has a hydroxyl group in the β position with respect to each of the sulfonium groups comprising the successive steps of:
   (a) reacting an epoxy group containing polymer with a mercaptan in the presence of a basic substance as an oxirane bridge opening catalyst so as to convert a portion of the epoxy groups into sulfide groups;
   (b) eliminating the residual epoxy groups from said sulfide group containing polymer by reaction thereof with a strong acid; and
   (c) reacting the resulting sulfide containing polymer with an alkyl halide or alkyl ester in a non-acid medium so as to convert said sulfide groups into sulfonium groups.
2. Method according to claim 1, wherein said polymer is first dissolved in an appropriate solvent and the solution obtained is mixed with 1 to 10 moles of said base catalyst per 100 epoxide groups present.
3. Method according to claim 2, wherein the solvent is an alcohol.
4. Method according to claim 1, 2 or 3, wherein the proportion of strong acid, used in step (b), is of 1.5 to 3 equivalents per unit of the remaining epoxy groups.
5. Method according to claim 4, wherein said strong acid is hydrochloric acid.
6. Method according to claim 1, 2 or 3, wherein the polysulfide obtained in step (a) is subjected to precipitation and purification before being treated with a strong acid in step (b).
7. Method according to claim 6, wherein precipitating the polysulfide is effected by the addition of a $C_6$ to $C_{10}$ alkane.
8. Method according to claim 1, wherein the step (c) is carried out with such a proportion of alkyl halide or ester that there are 1 to 5 alkyl groups for each sulfide group present in the polysulfide and the reaction is effected between 20° and 100° C.

9. Method according to claim 8, wherein there are 1.5 to 3.5 alkyl groups per sulfide group, and the temperature is 50° to 70° C.

10. Method according to claim 1, 2, 3, 9 or 11, wherein the epoxide groups containing polymer bears glycidyl moieties.

11. Method according to claim 1, wherein said polymer is a copolymer of an alkyl methacrylate or acrylate, of a vinyl ester, of styrene or of substituted styrene, with a glycidyl acrylate or methacrylate.

12. Method according to claim 1 wherein said mercaptan is lauryl, octyl or butyl mercaptan.

13. Method according to claim 13 wherein said epoxy group containing polymer is a copolymer of methyl methacrylate and glycidyl methacrylate.

14. A halide or ester salt of a polysulfonium polymer the chain of which bears lateral branchings terminating in a ternary sulfonium group and said chain having a hydroxyl group in the $\beta$ position with respect to each sulfonium group.

* * * * *